(12) United States Patent
Tripathi et al.

(10) Patent No.: US 9,159,032 B1
(45) Date of Patent: Oct. 13, 2015

(54) PREDICTING ARRIVAL TIMES OF VEHICLES BASED UPON OBSERVED SCHEDULE ADHERENCE

(71) Applicant: Xerox Corporation, Norwalk, CT (US)

(72) Inventors: Abhishek Tripathi, Bangalore (IN); Vaibhav Rajan, Bangalore (IN); Narayanan Unny Edakunni, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/219,487

(22) Filed: Mar. 19, 2014

(51) Int. Cl.
*G01C 21/00* (2006.01)
*G06N 5/04* (2006.01)
*G06N 5/02* (2006.01)
*G01C 21/34* (2006.01)

(52) U.S. Cl.
CPC ............ *G06N 5/048* (2013.01); *G01C 21/34* (2013.01); *G06N 5/02* (2013.01)

(58) Field of Classification Search
USPC .......................................................... 701/465
See application file for complete search history.

(56) References Cited

U.S. PATENT DOCUMENTS

| | | | |
|---|---|---|---|
| 6,006,159 A | 12/1999 | Schmier et al. | |
| 6,317,686 B1 | 11/2001 | Ran | |
| 6,486,801 B1 | 11/2002 | Jones | |
| 6,492,912 B1 | 12/2002 | Jones | |
| 6,618,668 B1 | 9/2003 | Laird | |
| 6,683,542 B1 | 1/2004 | Jones | |
| 6,952,645 B1 | 10/2005 | Jones | |
| 7,030,781 B2 | 4/2006 | Jones | |
| 7,546,206 B1 | 6/2009 | Miller et al. | |
| 7,720,630 B1 | 5/2010 | Miller et al. | |
| 8,275,540 B2 | 9/2012 | Downs et al. | |
| 2003/0236598 A1* | 12/2003 | Villarreal Antelo et al. ... 701/19 | |
| 2011/0161138 A1 | 6/2011 | Keaveny et al. | |
| 2013/0024249 A1 | 1/2013 | Zohar et al. | |
| 2013/0046586 A1* | 2/2013 | Lerner et al. ................. 705/7.39 |

(Continued)

OTHER PUBLICATIONS

Berkow et al., (2009) "Beyond Generating Transit Performance Measures: Visualizations and Statistical Analysis Using Historical Data", Transportation Research Record (2111), 158-168.

(Continued)

*Primary Examiner* — Hussein A. El Chanti
(74) *Attorney, Agent, or Firm* — Fox Rothschild LLP

(57) ABSTRACT

A method and system for determining real-time delay information in a transportation system. Historical operational information about the transportation system, including data related to a plurality of arrival events corresponding to one or more stops within the transportation system is received and a dependency graph is built based upon the historic information. The dependency graph defines relationships that exist in the transportation system between the plurality of arrival events, each of the relationships defining a specific dependent relationship between at least two of the arrival events. Delay dependency values are fitted into the dependency graph, each of the delay dependency values being associated with one of the plurality of relationships and defining a specific dependency value associated with that relationship. Predictive delay information is determined based upon the fitted dependency graph for one or more of the arrival events based upon current operating information.

16 Claims, 7 Drawing Sheets

(56) References Cited

U.S. PATENT DOCUMENTS

| | | |
|---|---|---|
| 2013/0164715 A1 | 6/2013 | Hunt et al. |
| 2013/0245884 A1* | 9/2013 | Forutanpour et al. ........... 701/36 |
| 2013/0339341 A1* | 12/2013 | Fan et al. ...................... 707/722 |
| 2013/0344802 A1* | 12/2013 | Armour et al. .................. 455/39 |
| 2014/0019177 A1* | 1/2014 | Smith .............................. 705/6 |
| 2014/0039986 A1 | 2/2014 | Handley |
| 2014/0200805 A1* | 7/2014 | Modica et al. ................. 701/466 |
| 2014/0278086 A1* | 9/2014 | San Filippo et al. .......... 701/527 |

OTHER PUBLICATIONS

Mandelzys et al., "Automatically Identifying the Causes of Bus Transit Schedule Adherence Performance Issues Using AVL/APC Archived Data", Nov. 3, 2009, Transportation Research Record: Journal of the Transportation Research Board, vol. No. 2143, published by National Academies, Washington, D.C. pp. 9-15.

Strathman et al., "Empirical Analysis of Bus Transit On-Time Performance", May 1992, Transportation Research A, V. 27A, pp. 93-100.

* cited by examiner

| AE | DAY OF THE YEAR | TIME OF ARRIVAL | DELAY |
|----|-----------------|-----------------|-------|
| 2  | 3               | 05:30           | 3     |
| 1  | 3               | 06:00           | 2     |
| 4  | 3               | 07:00           | 5     |
| 3  | 3               | 07:05           | -5    |
| 5  | 3               | 08:00           | 2     |
| 6  | 3               | 10:00           | 4     |
| 7  | 3               | 14:00           | 5     |
| 2  | 4               | 05:35           | 8     |
| 1  | 4               | 06:00           | 2     |
| .  | .               | .               | .     |
| .  | .               | .               | .     |

PREDICTING ARRIVAL TIMES OF VEHICLES BASED UPON OBSERVED SCHEDULE ADHERENCE

BACKGROUND

The present disclosure relates to predicting arrival times of vehicles in a public transportation system, such as a public bus, train or plane system. More specifically, the present disclosure relates to modeling dependency graphs to predict the arrival times of the vehicles.

Public transportation is a crucial element of most cities and towns all around the world. It is generally a safe, cheap and a sustainable mode of transportation for large numbers of people. However, adoption and utilization of public transportation by the general public typically depends on the quality of service being provided.

Many service providers monitor and analyze analytics related to the services they provide. For example, computer aided dispatch/automated vehicle location (CAD/AVL) is a system in which public transportation vehicle positions are determined through a global positioning system (GPS) and transmitted to a central server located at a transit agency's operations center and stored in a database for later use. The CAD/AVL system also typically includes two-way radio communication by which a transit system operator can communicate with vehicle drivers. The CAD/AVL system may further log and transmit incident information including an event identifier (ID) and a time stamp related to various events that occur during operation of the vehicle. For example, for a public bus system, logged incidents can include door opening and closing, driver logging on or off, wheel chair lift usage, bike rack usage, current bus condition, and other similar events. Some incidents are automatically logged by the system as they are received from vehicle on-board diagnostic systems or other data collection devices, while others are entered into the system manually by the operator of the vehicle.

For a typical public transportation company, service reliability is defined as variability of service attributes. Problems with reliability are ascribed to inherent variability in the system, especially demand for transit, operator performance, traffic, weather, road construction, crashes, and other similar unavoidable or unforeseen events. As transportation providers cannot control all aspects of operation owing to these random and unpredictable disturbances, they must adjust to the disturbances to maximize reliability. Several components that determine reliable service are schedule adherence, maintenance of uniform headways (e.g., the time between vehicles arriving in a transportation system), minimal variance of maximum passenger loads, and overall trip times. However, most public transportation companies put a greater importance on schedule adherence, including predicted arrival times of a vehicle at a specific stop.

Research related to travel time prediction is generally classified into two categories: (1) dynamically tracking a vehicle to predict its likely arrival time at a specific stop; and (2) using historical information to map a set of static features (such as time of day, bus stop location, route information) to calculate arrival time at a specific stop. However, both of these approaches have various drawbacks. Approach 1 relies heavily on the real-time tracking signal (e.g., the GPS location of a vehicle) and is greatly impacted by problems with the tracking signal such as loss of signal during operation of the vehicle. Additionally, approach 1 is directed to real-time modeling of the movement of the vehicle, and is more highly effective for short range predictions.

In approach 2, the models used are typically based upon static features such as historical operating parameters of a vehicle or a specific route within the transportation system. This results in a prediction that is typically accurate for long range time predictions, but it cannot quickly adapt to changing dynamics within the transportation system that can result in unexpected delays or changes to arrival times.

SUMMARY

In one general respect, the embodiments as described herein disclose a method for determining real-time delay information in a transportation system. The method includes receiving historical operational information about the transportation system, wherein the historical operational information comprises data related to a plurality of arrival events corresponding to one or more stops within the transportation system. The method further includes building a dependency graph based upon the historic information, wherein the dependency graph defines a plurality of relationships that exist in the transportation system between the plurality of arrival events, and wherein each of the plurality of relationships defines a specific dependent relationship between at least two of the plurality of arrival events and fitting a plurality of delay dependency values into the dependency graph, wherein each of the plurality of delay dependency values is associated with one of the plurality of relationships and defines a specific dependency value associated with that relationship. Additionally, the method includes determining predictive delay information as determined based upon the fitted dependency graph for one or more of the plurality of arrival events based upon current operating information related to the transportation system and outputting an indication of the predictive delay information.

In another general respect, the embodiments as described herein disclose a system for determining real-time delay information in a transportation system. The system includes a processing device and a non-transitory computer readable medium in communication with the processing device. The computer readable medium comprising one or more programming instructions for causing the processing device to receive historical operational information about the transportation system, wherein the historical operational information comprises data related to a plurality of arrival events corresponding to one or more stops within the transportation system, build a dependency graph based upon the historic information, wherein the dependency graph defines a plurality of relationships that exist in the transportation system between the plurality of arrival events, and wherein each of the plurality of relationships defines a specific dependent relationship between at least two of the plurality of arrival events, fit a plurality of delay dependency values into the dependency graph, wherein each of the plurality of delay dependency values is associated with one of the plurality of relationships and defines a specific dependency value associated with that relationship, determine predictive delay information as determined based upon the fitted dependency graph for one or more of the plurality of arrival events based upon current operating information related to the transportation system, and output an indication of the predictive delay information.

DETAILED DESCRIPTION

Figure 1:
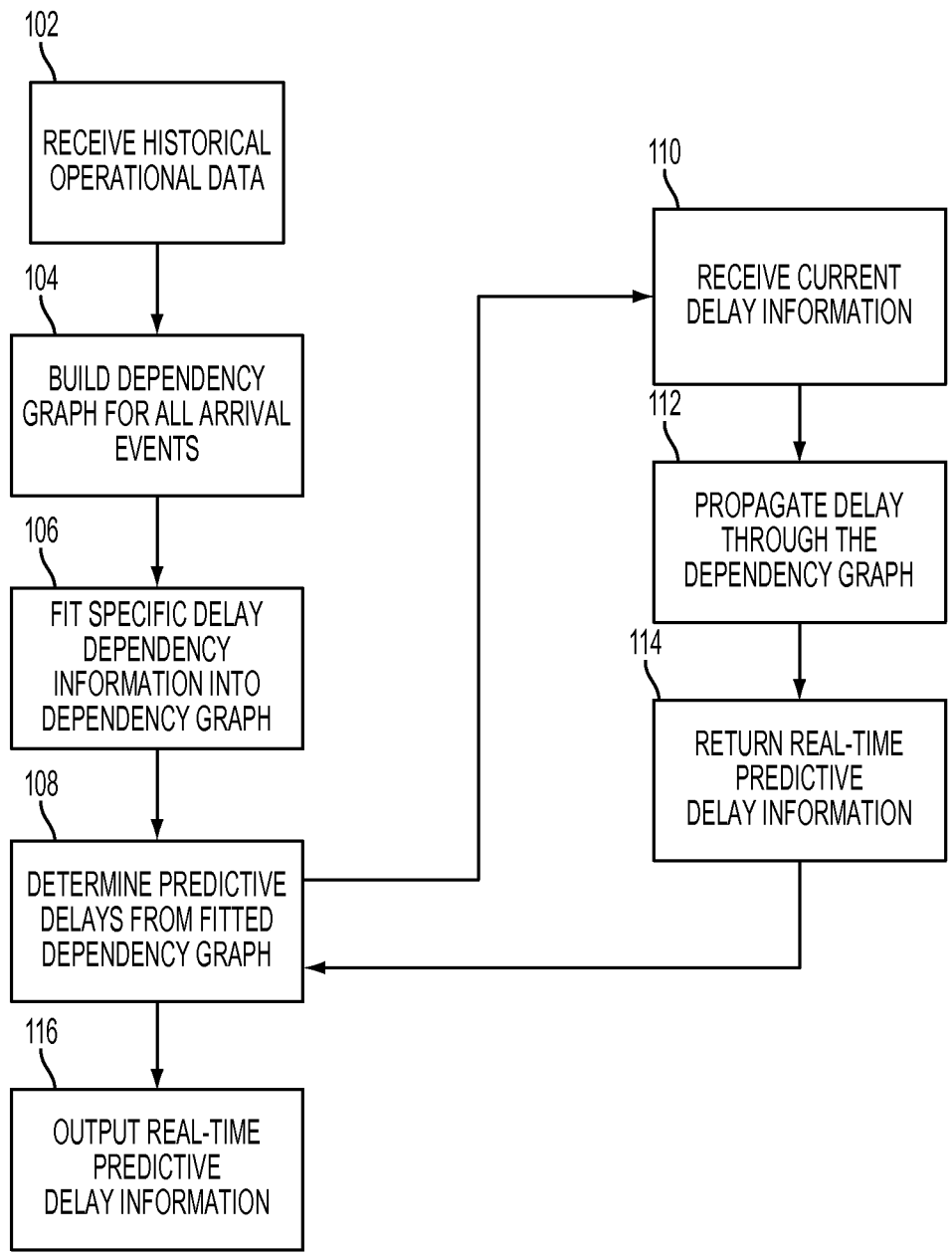
FIG. 1 depicts a sample flow chart for determining real-time delay information based upon observed schedule adherence according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

As used herein, a "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute instructions.

A "dependency graph" refers to a directed graph showing a set of nodes connected by edges, wherein the edges have an associated direction defining a dependency between one node and another. A dependency between edge-connected nodes may be defined and quantified by a value assigned to the edge.

The present disclosure is directed to techniques for predicting arrival times of vehicles at different locations in a transportation network. It should be noted that the following examples refer to vehicles such as busses in a public transportation system by way of example only, and the techniques and processes as described herein can be applied to additional modes of transportation including, but not limited to, trains, boats, trams, airplanes, and other similar vehicles that operate on a fixed schedule.

As described herein, historical data related to operation of a transportation network, specifically data related to vehicle delay at different stops at different points of time in a day, that can be used to build a network of dependencies among the vehicle stops in the transportation network, represented as a dependency graph. As described herein, an arrival event (AE) refers to an abstract entity that corresponds to a particular vehicle (e.g., a bus) arriving at a particular stop at a particular time of the day. For a specific transportation system, there may be a set of unique AEs in a day such that an AE would not be observed more than once in a day. In terms of implementation, an AE can be models as a tuple, or an ordered list of elements. For example, a tuple for an AE may include {route ID of the vehicle, trip ID of the vehicle, ID of the stop, expected time of arrival}. This model of AE may ensure that each AE uniquely identifies an item in the schedule of the transportation system without any repetition of AEs. During observance of the operation of the vehicles in the transportation system, each AE may be associated with an actual time of arrival and, as determined based upon the AE's associated expected time of arrival, a delay. Based upon the measured delays for one or more AEs, the present disclosure models expected delay for AEs that are directly dependent upon AEs that precede them in time.

In the following examples, a simplified public transportation system is described that includes seven AEs, labeled sequentially as 1 through 7 in the figures. For example, in the dependency graphs as shown in FIGS. 3-6, each circled number 1 through 7 represent a specific AE. It should be noted, however, that the AEs as observed and measured herein may not all be on the same vehicle route within the transportation system. Rather, all stops, and thus all AEs, within the transportation are measured and analyzed to determine delay dependency information.

FIG. 1 illustrates an example of a flow for a particular process for determining expected delay in a transportation system according to an embodiment. A system, such as a monitoring and/or dispatching computer system associated with an operations center for the transportation network, may receive 102 a listing of historical operational data. The historical data may represent data related to the AEs in the transportation system as observed over a number of days.

Figures 2, 3:
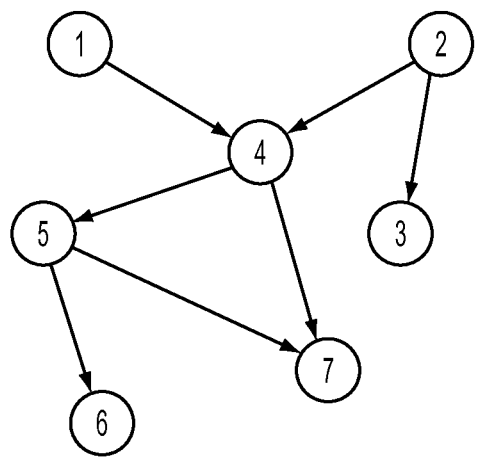
FIG. 2 depicts a sample listing of historic data for building a dependency model according to an embodiment.
FIG. 3 depicts a sample dependency graph according to an embodiment.

An example of a data structure for storing the historical information is shown in FIG. 2, where a sample table includes a listing of AE, a day of the year column indicating on which day the information was collected, a time of arrival column indicating what time of the day the information was collected, and a delay column indicating what the observed delay was for that AE on that specifically listed day and time. As shown in FIG. 2, the delay may be a positive or negative number. A positive number may indicate that the bus was late in arriving to the stop associated with that AE. Conversely, a negative number may indicate that the vehicle was early arriving to the stop associated with that AE.

Based upon the historical data, a dependency graph or model for the transportation system may be built 104 for each of the AEs. By performing various calculations and analysis, various parameters for the construction of the dependency graph may be determined. For example, dependencies to preceding AEs may be determined fir each subsequent AE. For example, as shown in FIG. 2, AEs 1, 2 and 3 consistently precede AE 4. Thus, a dependency relationship may be determined that maps the delay associated with AEs 1, 2 and 3 to the delay of AE 4.

Based upon further analysis of the historical information, the system may build a dependency graph for all AEs in the transportation system, and fit 106 specific delay dependency information into the dependency graph. For example, specific edge values may be assigned to each dependency relationship as shown in the dependency graph, defining a specific quantifiable relationship between the AEs.

To continue the above example, based upon the historical information it is shown that AEs 1, 2 and 3 consistently precede AE 4 in time. However, as shown in FIG. 3, this does not necessarily mean that a delay at each of AEs 1, 2 and 3 directly contributes to the delay at AE 4. Mathematically, a probability distribution of delay at AE 4 may be conditioned on the observed delays at AEs 1, 2 and 3. Such a distribution may be expressed mathematically as $P(a_4|a_1, a_2, a_3)$, wherein $a_1 \ldots a_4$ are random variables corresponding to delays of the respective AEs.

In an embodiment, specific dependency values may be modeled using a simple linear relation between an outcome AE (e.g., AE 4) and the dependent AEs. For example, the probabilistic distribution of a4 may be modeled as a linear combination of a1, a2 and a3, with a Gaussian noise value corrupting the outcome, represented as:

$$a_4 = m_1 a_1 + m_2 a_2 + m_3 a_3 + \epsilon$$

where $m_1$, $m_2$ and $m_3$ represent coefficients of regression for each respective AE, and $\epsilon$ corresponds to the Gaussian white noise.

When fitting the model to the data, it is desirable to obtain sparse models where one or more of the coefficients of regression are zero. A highly sparse model may ensure that only the most influential dependencies are included in the model, and hence improves the interpretability of the model. Thus, a lasso regression may be used to produce a sparse model. A lasso regression, or a lasso linear regression, is a process that encourages sparse models of linear fit, where multiple independent variables are excluded from the mapping. In this example, running a lasso regression on the historical data may result in $m_3=0$, which indicates that there is 0 dependency value between AE 4 and AE 3, leading to the conclusion that AE 4 is dependent only upon AE 1 and AE 2. Additionally, the lasso regression may also result in $m_1=1$ and $m_2=2.2$, indicating that there is a dependency value of 1 between AE 4 and AE 1, and a dependency value of 2.2 between AE 4 and AE 2.

Such a determination and modeling process may be completed for each AE to determine which preceding AEs impact its delay, and a complete dependency graph for the transportation system may be built 104. FIG. 3 illustrates a sample dependency graph showing the relationships between each of the stops in the transportation system, and how AEs at each of the stops are directly relate and dependent upon each other. Each node in the dependency graph represents a specific AE, and the directed edges in the graph represent dependency. The arrows on each edge indicate the direction of flow of the dependency. For example, as shown in FIG. 3, AE 5 is directly dependent upon AE 4, which is directly dependent upon AEs 1 and 2. Thus, any delay at AEs 1 and 2 will indirectly contribute to the delay at AE 5.

Figure 4:
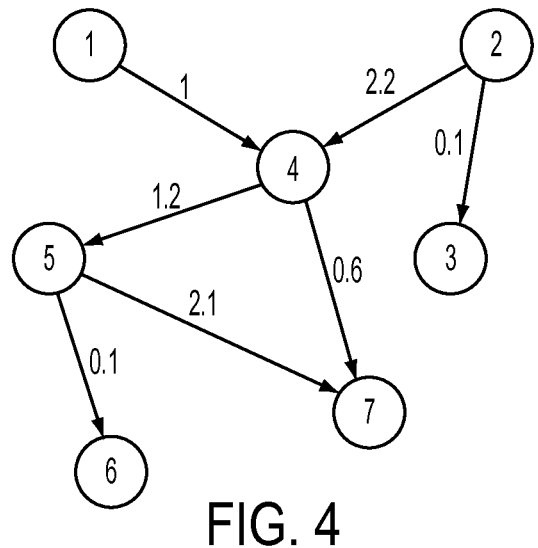
FIG. 4 illustrates the sample dependency graph of FIG. 3 including a listing of nodal dependency values according to an embodiment.

Similarly, as the dependency determination is completed for each AE in the transportation system, a quantitative dependency value for each dependent relationship may be determined. The specific delay dependency information can be fitted 106 into the previously built dependency graph. For example, as shown in FIG. 4, the specific delay dependency information may be represented as weights on each edge of the dependency graph. As described above, a dependency value of 1 was determined for $m_1$, which represents the dependency value or strength between AE 1 and AE 4, and is thus assigned to the arrow between AE 1 and AE 4. Similar values may be assigned to each dependent relationship within the dependency graph, resulting in the fitted dependency graph as shown in FIG. 4. Additionally, as shown in FIG. 4, AE 1 and AE 2 may be considered parent nodes in the dependency graph as those specific nodes are not dependent upon any other nodes in the graph. Similarly, AEs 3, 4, 5, 6 and 7 may be considered child nodes as they are dependent upon at least one other node in the dependency graph.

It should be noted that the modeling techniques as described above with regard to building 104 and fitting 106 the dependency graph are shown by way of example only, and additional modeling techniques may be used. For example, more complex techniques like non-linear regression modeling may be used. Similarly, external variables such as weather information, demographic information, the day of the week, and other similar variables could be used to enrich the model.

Additionally, it should be noted that the dependency graphs as shown herein are shown as acyclic graphs by way of example only. However, it is likely that applying the techniques as described herein would result in an acyclic graph as the graphs are typically constructed such that any parent node will precede a child node in time. Such a condition may prevent any cycles in the graph.

After the dependency graph is built 104 and fitted 106 with specific delay dependency information, the graph may be used to determine 108 predictive delays that are likely to occur in the transportation system. To determine 108 the predictive delays, an algorithm or other similar process may receive 110 observed delay at one or more particular AEs which can be used to predict the delay of AEs that are dependent upon the observed AEs. The predictive delays at those AEs can then be propagated 112 through the dependency graph to each additional AE.

Figure 5:
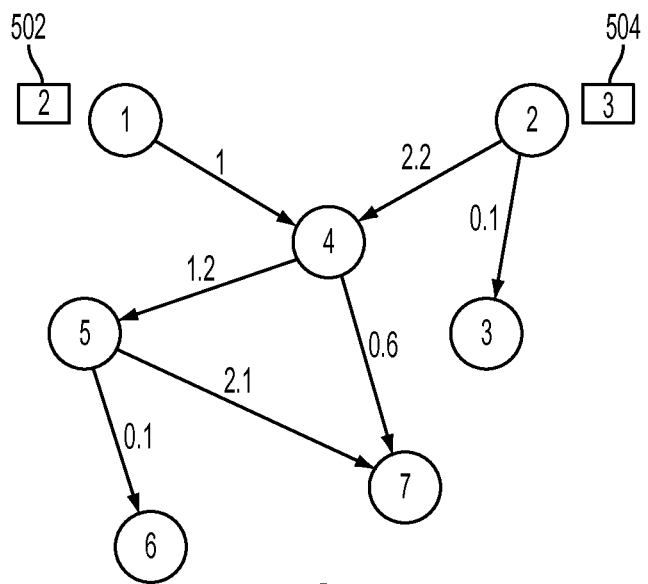
FIG. 5 illustrates the sample dependency graph of FIG. 4 including observed delay values for multiple nodes within the graph according to an embodiment.

In order to fully propagate the delay information, delay information for each node that functions solely as a parent (i.e., each node that is not dependent upon any other nodes) should be observed. For example, as shown in FIG. 5, the current delay information for node 1 (relating to AE 1) and node 2 (relating to AE 2) should be observed. As shown in FIG. 5, the current delay 502 for AE 1 may be 2 minutes, and the current delay 504 for AE 2 may be 3 minutes.

Figure 6:
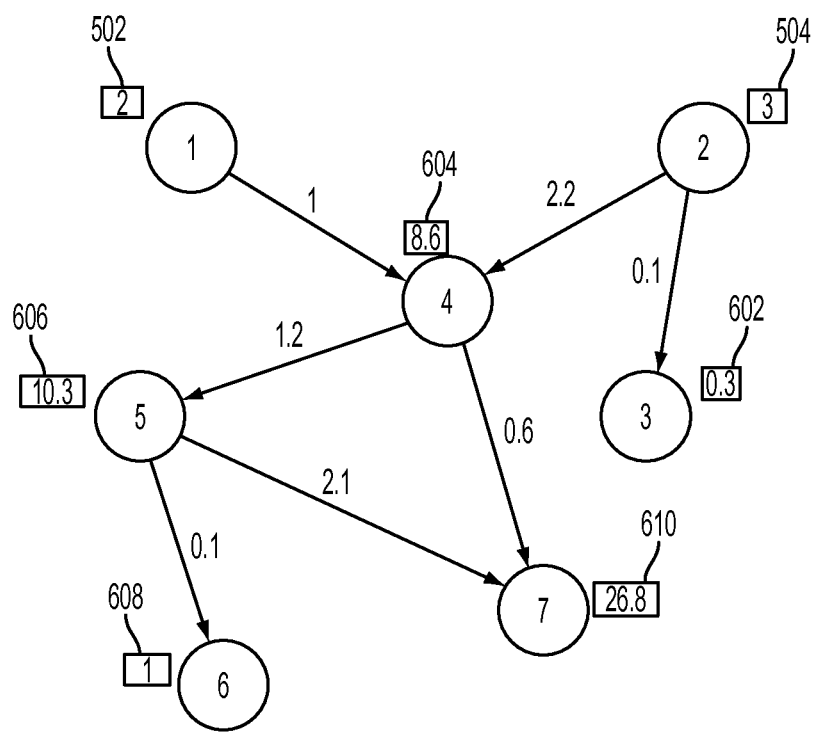
FIG. 6 depicts the sample dependency graph of FIG. 5 with delay values propagated to each node within the graph according to an embodiment.

Based upon the relationships and dependency values as previously determined and included in the dependency graph, these current delay values may be propagated 112 throughout the graph, resulting in a set of real-time predictive delay information. For example, as shown in FIG. 6, the set of real-time predictive delay information may include a predictive delay 602 of 0.3 minutes for AE 3 (i.e., the 3 minute delay currently observed at AE 2 times the dependency value 0.1 between AE 2 and AE 3). Additionally, to continue the above example, the set of real-time predictive delay information may include:

A predictive delay 604 of 8.6 minutes for AE 4 (i.e., the 2 minute delay currently observed at AE 1 times the dependency value of 1 between AE 1 and AE 4 plus the 3 minute delay currently observed at AE 2 times the dependency value of 2.2 between AE 2 and AE 4);

A predictive delay 606 of 10.3 minutes for AE 5 (i.e., the 8.6 minute predictive delay 604 for AE 4 times the dependency value 1.2 between AE 4 and AE 5);

A predictive delay 608 of 1 minute at AE 6 (i.e., the 10.3 minute predictive delay 606 of AE 5 times the dependency value of 0.1 between AE 5 and AE 6); and A predictive delay 610 of 26.8 minutes for AE 7 (i.e., the 8.6 minute predictive delay 608 of AE 4 times the dependency value of 0.6 between AE 4 and AE 7 plus the 10.3 minute predictive delay 606 of AE 5 times the dependency value of 2.1 between AE 5 and AE 7).

Figure 7A:
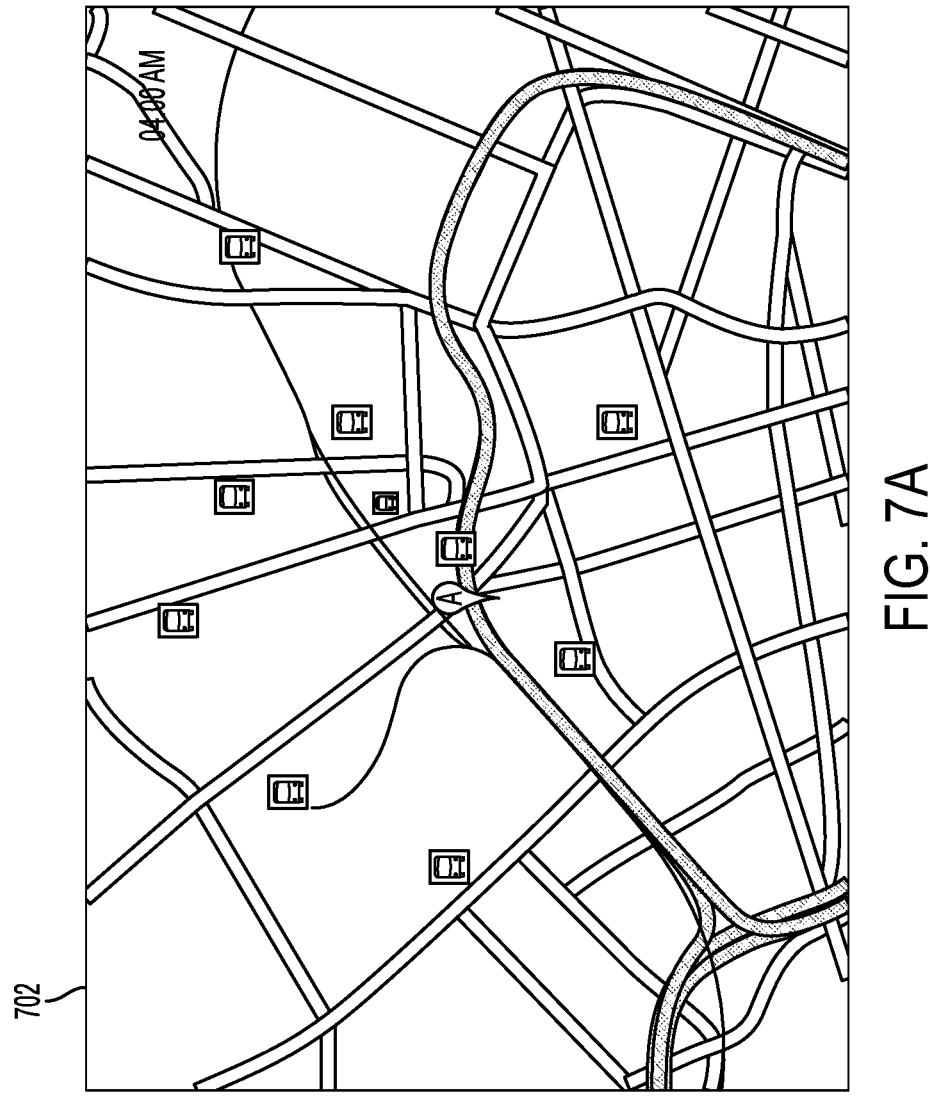
FIGS. 7A and 7B depict sample visualizations of the delay information as displayed on a map according to an embodiment.
Figure 7B:
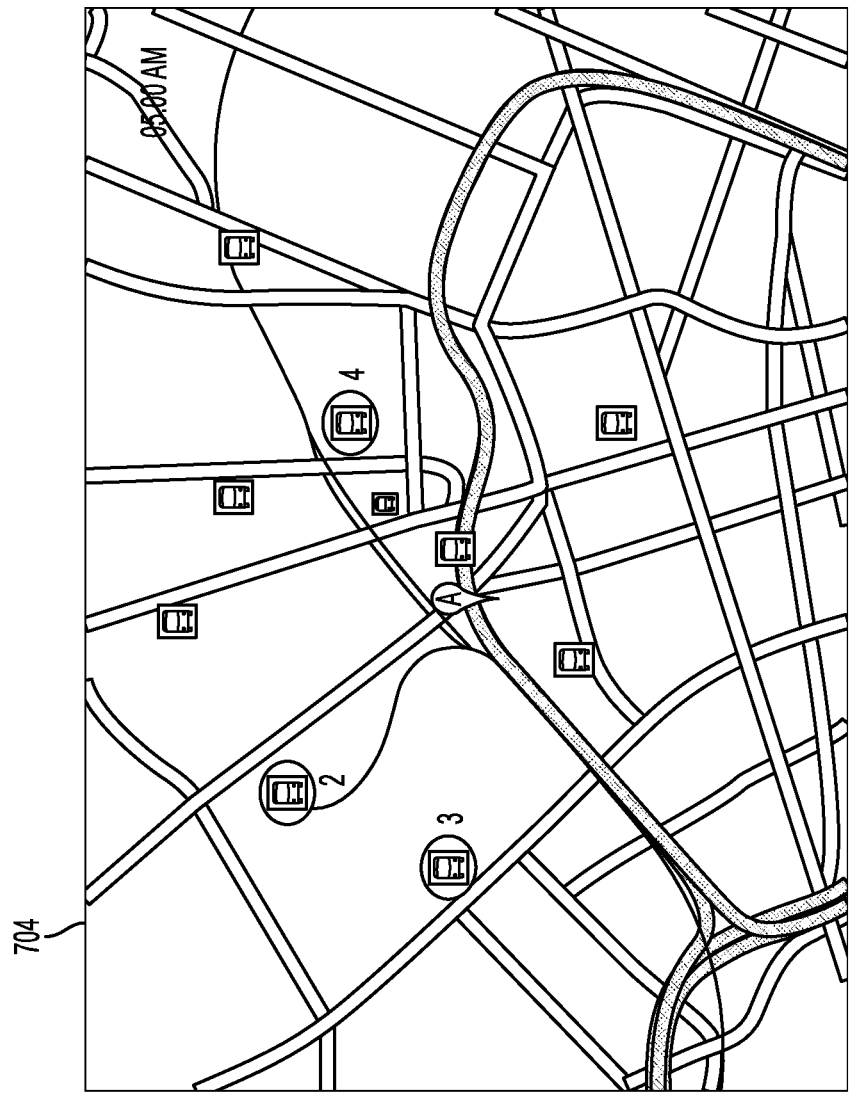

The algorithm or other process may return 114 the real-time predictive delay information to the computer system, which may output 116 the real-time predictive delay information. For example, the predictive delay information may be output 116 as an updated visualization of the current operating status of a transportation network. As shown in FIG. 7A, a map 702 may include a visual representation of each stop for a particular transportation network. Upon determining 108 the real-time predictive delay information, the system may produce an updated map 704 that includes both a visual representation of each stop in the transportation network, but also a predictive delay value for each upcoming arrival event associated with those stops. Such a visualization may aid a dispatch operator or a manager of the transportation system quickly analyze what the predictive delays look like for the transportation system, and make alterations to the operation of the transportation system, such as dispatching additional or larger vehicles, to reduce any anticipated delays.

Additionally, the predictive delays may be output 116 in additional manners. For example, digital display boards at each stop may be updated to include predictive delay information, thereby informing passengers of any potential delays they may experience. Additionally, warnings or other messages may be automatically sent to a driver indicating that their current timing information indicates that they may experience a delay at later stops. The driver may adjust their route accordingly. For example, the driver may reduce the amount of time they wait at a particular stop before proceeding to the next stop.

Additionally, the real-time predictive information can be used beyond merely providing information related to the current operational status of a transportation network. For example, the predictive delay information may be collected, categorized and analyzed to produce one or more trend reports that can be used to identify specific areas in the transportation network that are likely to have predictive delays, as well as specific times of the day or days of the week when delays are likely to be predicted. Such trend reports can be used to alter schedules, provide additional training to drivers and operational personnel, and perform other actions that may prevent additional delays in the future.

Figure 8:
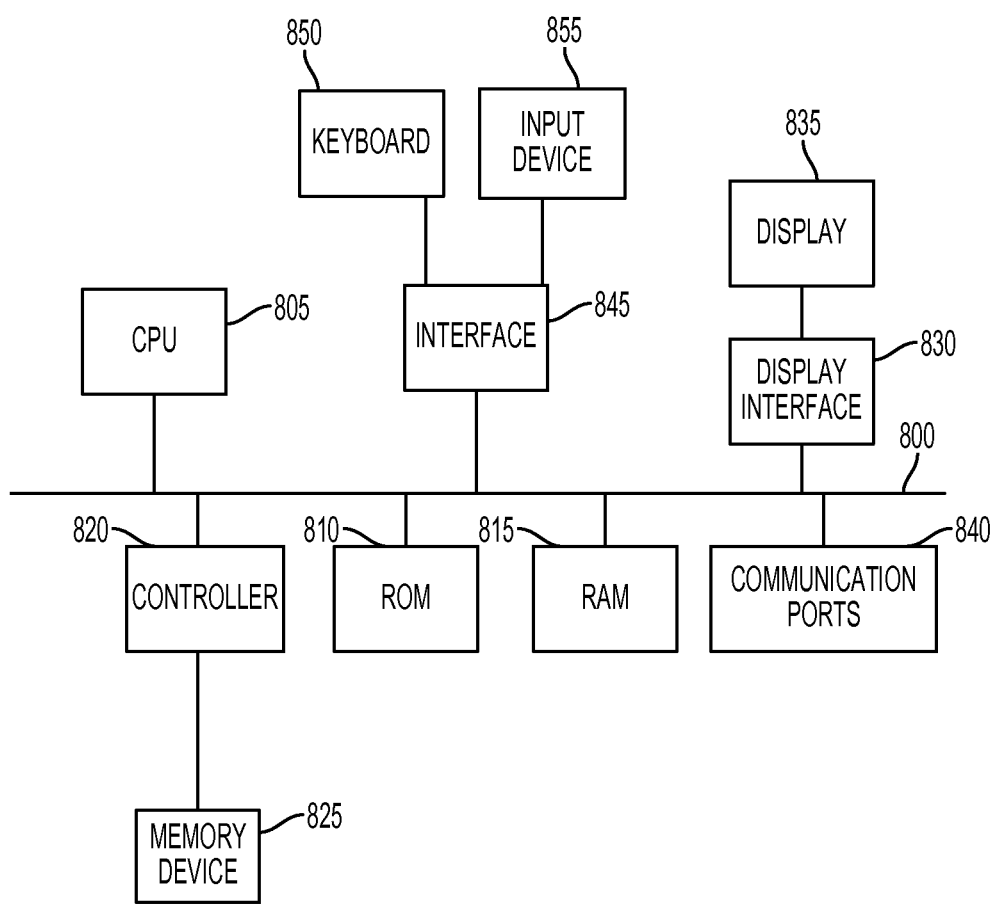
FIG. 8 depicts various embodiments of a computing device for implementing the various methods and processes described herein.

The calculations, modeling, analysis and derivations as described above may be performed and implemented by an operator of a computing device located at an operations center (e.g., a central operations center for a public transportation provider). FIG. 8 depicts a block diagram of internal hardware that may be used to contain or implement the various computer processes and systems as discussed above. An electrical bus 800 serves as the main information highway interconnecting the other illustrated components of the hardware. CPU 805 is the central processing unit of the system, performing calculations and logic operations required to execute a program. CPU 805, alone or in conjunction with one or more of the other elements disclosed in FIG. 8, is a processing device, computing device or processor as such terms are used within this disclosure. Read only memory (ROM) 810 and random access memory (RAM) 815 constitute examples of memory devices.

A controller 820 interfaces with one or more optional memory devices 825 to the system bus 800. These memory devices 825 may include, for example, an external or internal DVD drive, a CD ROM drive, a hard drive, flash memory, a USB drive or the like. As indicated previously, these various drives and controllers are optional devices. Additionally, the memory devices 825 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 810 and/or the RAM 815. Optionally, the program instructions may be stored on a tangible computer readable medium such as a compact disk, a digital disk, flash memory, a memory card, a USB drive, an optical disc storage medium, a distributed computer storage platform such as a cloud-based architecture, and/or other recording medium.

An optional display interface 830 may permit information from the bus 800 to be displayed on the display 835 in audio, visual, graphic or alphanumeric format. Communication with external devices may occur using various communication ports 840. A communication port 840 may be attached to a communications network, such as the Internet or a local area network.

The hardware may also include an interface 845 which allows for receipt of data from input devices such as a keyboard 850 or other input device 855 such as a mouse, a joystick, a touch screen, a remote control, a pointing device, a video input device and/or an audio input device.

It should be noted that a public transportation system is described above by way of example only. The processes, systems and methods as taught herein may be applied to any environment where performance based metrics and information are collected for later analysis, and provided services may be altered accordingly based upon the collected information to improve reliability or to reduce delay.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for determining real-time delay information in a transportation system, the method comprising:
   receiving, by a processing device, historical operational information about the transportation system, wherein the historical operational information comprises data related to a plurality of arrival events corresponding to one or more stops within the transportation system;
   building, by the processing device, a dependency graph based upon the historic information, wherein the dependency graph defines a plurality of relationships that exist in the transportation system between the plurality of arrival events, and wherein each of the plurality of relationships defines a specific dependent relationship between at least two of the plurality of arrival events;
   fitting, by the processing device, a plurality of delay dependency values into the dependency graph, wherein each of the plurality of delay dependency values is associated with one of the plurality of relationships and defines a specific dependency value associated with that relationship;
   determining, by a processing device, predictive delay information as determined based upon the fitted dependency graph for one or more of the plurality of arrival events based upon current operating information related to the transportation system;
   outputting, by a processing device, an indication of the predictive delay information;
   receiving at least one real-time observed delay for the at least one of the plurality of arrival events associated with the parent node;
   propagating the delay through the fitted dependency graph; and
   returning real-time predictive delay information based upon the propagation.

2. The method of claim 1, wherein the dependency graph comprises at least one parent node representing at least one of the plurality of arrival events that is not dependent upon any other of the plurality of arrival events.

3. The method of claim 1, wherein each arrival event comprises an associated geographic location and an associated time of day that the arrival event is predicted to occur.

4. The method of claim 1, wherein building the dependency graph further comprises modeling the historical operational information using a linear relation model to determine the relationships between the plurality of arrival events.

5. The method of claim 4, wherein modeling the historical operational information using a linear regression model further comprises including external variables including at least one of weather information, demographic information, and timing information.

6. The method of claim 1, wherein fitting the dependency graph further comprises:
   determining, for each relationship in the dependency graph, a coefficient of regression for each of the plurality of arrival events associated with the relationship; and
   modeling each relationship using a linear regression model to determine the delay dependency value for that relationship.

7. The method of claim 6, wherein the linear regression model comprises a lasso regression model.

8. The method of claim 1, wherein outputting an indication of predictive delay information comprises at least one of:
   producing a report outlining the predictive delay information;
   updating dynamic display information at one or more stops in the transportation system indicating at least a portion of the predictive delay information;
   providing at least a portion of the predictive delay information to one or more vehicle operators in the transportation system; and
   providing at least a portion of the predictive delay information to a dispatcher in the transportation system.

9. A system for determining real-time delay information in a transportation system, the system comprising:
   a processing device; and
   a non-transitory computer readable medium in communication with the processing device, the computer readable medium comprising one or more programming instructions for causing the processing device to:
   receive historical operational information about the transportation system, wherein the historical operational information comprises data related to a plurality of arrival events corresponding to one or more stops within the transportation system,
   build a dependency graph based upon the historic information, wherein the dependency graph defines a plurality of relationships that exist in the transportation system between the plurality of arrival events, and wherein each of the plurality of relationships defines a specific dependent relationship between at least two of the plurality of arrival events,
   fit a plurality of delay dependency values into the dependency graph, wherein each of the plurality of delay dependency values is associated with one of the plurality of relationships and defines a specific dependency value associated with that relationship,
   determine predictive delay information as determined based upon the fitted dependency graph for one or more of the plurality of arrival events based upon current operating information related to the transportation system,
   output an indication of the predictive delay information;
   receive at least one real-time observed delay for the at least one of the plurality of arrival events associated with the parent node;
   propagate the delay through the fitted dependency graph; and
   return real-time predictive delay information based upon the propagation.

10. The system of claim 9, wherein the dependency graph comprises at least one parent node representing at least one of the plurality of arrival events that is not dependent upon any other of the plurality of arrival events.

11. The system of claim 9, wherein each arrival event comprises an associated geographic location and an associated time of day that the arrival event is predicted to occur.

12. The system of claim 9, wherein the one or more instructions for causing the processing device to build the dependency graph further comprise one or more instructions for causing the processing device to model the historical operational information using a linear relation model to determine the relationships between the plurality of arrival events.

13. The system of claim 12, wherein the one or more instructions for causing the processing device to model the historical operational information using a linear regression model further comprise one or more instructions for causing the processing device to include external variables including at least one of weather information, demographic information, and timing information.

14. The system of claim 9, wherein the one or more instructions for causing the processing device to fit the dependency graph further comprise one or more instructions for causing the processing device to:
   determine, for each relationship in the dependency graph, a coefficient of regression for each of the plurality of arrival events associated with the relationship; and
   model each relationship using a linear regression model to determine the delay dependency value for that relationship.

15. The system of claim 14, wherein the linear regression model comprises a lasso regression model.

16. The system of claim 9, wherein the one or more instructions for causing the processing device to output an indication of predictive delay information comprise one or more instructions for causing the processing device to perform at least one of:
   produce a report outlining the predictive delay information;
   update dynamic display information at one or more stops in the transportation system indicating at least a portion of the predictive delay information;
   provide at least a portion of the predictive delay information to one or more vehicle operators in the transportation system; and
   provide at least a portion of the predictive delay information to a dispatcher in the transportation system.

* * * * *